United States Patent [19]

Lindström

[11] Patent Number: 5,431,272

[45] Date of Patent: Jul. 11, 1995

[54] PART MOVING MECHANISM

[75] Inventor: Mikko Lindström, Streamwood, Ill.

[73] Assignee: Finn-Power International, Inc., Schaumburg, Ill.

[21] Appl. No.: 6,761

[22] Filed: Jan. 21, 1993

[51] Int. Cl.⁶ ............................................. B65G 47/00
[52] U.S. Cl. .................. 198/345.1; 198/721; 198/725
[58] Field of Search ............ 198/345.1, 721, 725; 83/155; 144/245 R, 245 A, 249 R, 249 A; 72/426

[56] References Cited

U.S. PATENT DOCUMENTS

| | | | |
|---|---|---|---|
| 1,089,901 | 3/1914 | Carson | 144/249 R |
| 2,732,867 | 1/1956 | May et al. | 198/725 |
| 3,511,497 | 5/1970 | Flanagan | 198/725 |
| 3,783,917 | 1/1974 | Mochizuki | 144/245 A |
| 4,384,433 | 5/1983 | Van Der Linden | 144/245 A |
| 4,721,202 | 1/1988 | Fryer et al. | 198/725 |
| 5,158,280 | 10/1992 | Sanchez | 198/725 |

Primary Examiner—Joseph E. Valenza
Attorney, Agent, or Firm—Pollock, Vande Sande & Priddy

[57] ABSTRACT

To move or remove a workpiece from a worktable, as for example a finished workpiece from a work station, an elongate conveyer member, once it has been positioned so that at least a portion thereof is superposed over the finished workpiece, is lowered to contact at least one portion of the finished workpiece. Upon contact, the conveyer member is activated to convey the workpiece away from the work station, and if desired, automatically convey the workpiece to a storage bin or pallet.

2 Claims, 6 Drawing Sheets

PART MOVING MECHANISM

FIELD OF THE INVENTION

The present invention relates to metal forming systems and more particularly to an apparatus for moving a workpiece on a worktable in a metal forming environment.

BACKGROUND OF THE INVENTION

In a metal fabrication machine center environment having, for example, turret punches and right angle shears, to load a workpiece onto a worktable for cutting or punching and remove the workpiece (or parts finished therefrom) from the worktable, a loader and an unloader are used. Such loader/unloader system is well known and is represented for example by the Finn-Power cantilever loading and unloading units. In a small shop environment in which metal forming machinery consists mainly of nibbling tools and/or punches, the installation of such separate loading/unloading units would be cost prohibitive.

Figure 1:
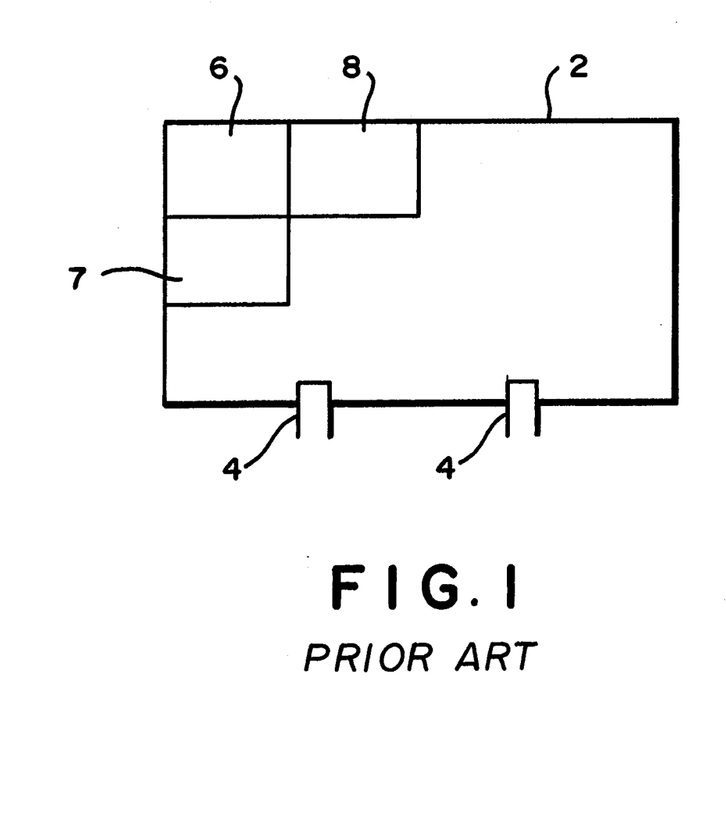
FIG. 1 is an illustration of a workpiece having right angle cut finished portions.

Prior to the instant invention, to remove a finished portion from a large workpiece, a right angle shear is used to cut the finished portion from the workpiece as illustrated in FIG. 1. In brief, as shown in FIG. 1, to remove finished portions from a workpiece 2, clamps 4 which grip the workpiece 2 are moved so as to place workpiece 2 underneath a right angle shear (not shown) such that finished portions 6, 7, 8 etc. can be cut from workpiece 2. The finished portions are then separately removed. In a machine center, the removal of the finished portions is done by the unloader unit. In a small shop environment, the finished portions are removed manually.

Figure 2:
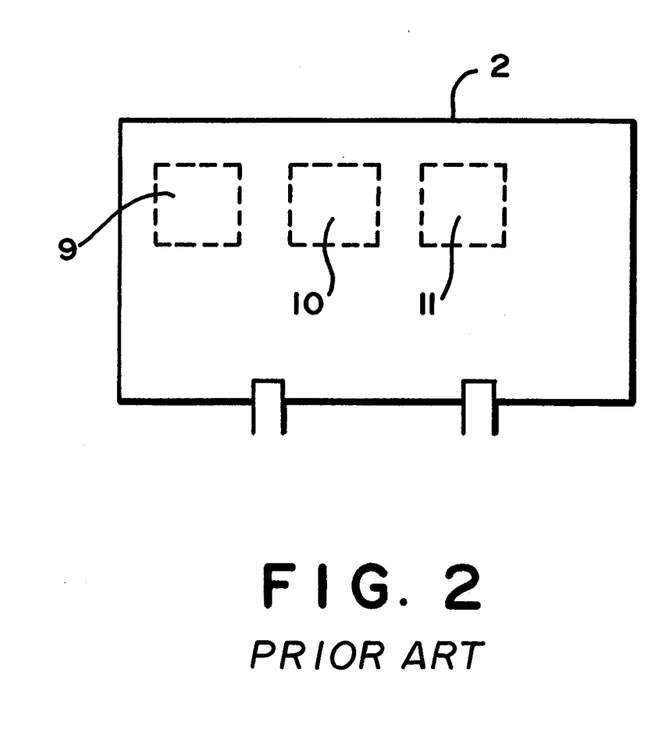
FIG. 2 is an illustration of a workpiece having nibbled shaker finished portions.

A second method in which finished portions are removed from a workpiece is shown in FIG. 2 where it can be seen that a plurality of finished pieces 9, 10, 11 are nibbled from workpiece 2 such that they become "shaker" parts which remain connected to workpiece 2 by a plurality of small linking sections. Once all of the finished portions are nibbled, workpiece 2 is removed from the worktable and shaked, so that the nibbled finished pieces fall out. One disadvantage with the shaker approach is that a large portion of workpiece 2 is wasted due to the need to leave a sufficient large skeleton base for holding the shaker pieces before those pieces are dislodged from workpiece 2.

The two finished part removal methods illustrated in FIGS. 1 and 2 are acceptable so long as a manufacturer can afford a right angle shear and/or willing to accept a large amount of waste.

A prior art system by the Finn-Power Company for overcoming the disadvantages of the methods mentioned above comprises a system having a frame mounted to the operating frame of the turret, nibbling tool etc. Mounted underneath the frame along a longitudinal direction is a drive cylinder that has connected underneath thereto a movable suction cup that can be moved up and down, and along the direction of the air cylinder so that the suction cup can come down and suction the finished workpiece and remove it from the worktable. The problem with such prior art system is that oftentimes the suction cup will butt against the remaining portion of the workpiece. Since oftentimes the workpiece is quite thin, it is readily damaged. Yet another disadvantage of the prior art system is that it is quite slow and requires a setting for the movement of the suction cup that has to be carefully maintained. If not, the suction cup may end up missing the mark and not suction the finished workpiece.

BRIEF DESCRIPTION OF THE PRESENT INVENTION

The present invention provides an economical alternative to the above-identified methods of moving or removing a part from a worktable in a metal fabrication environment. Specifically, the present invention apparatus has an inverted L-shaped frame to whose horizontal arm is coupled a support plate. Movably attached to the support plate is an inverted U-shaped carriage member movable in a vertical fashion relative to the horizontal arm of the inverted L-shaped frame. The U-shaped carriage member is movably connected to the support base plate by means of a drive cylinder, which is bolted to the support base plate and whose piston shaft effects the U-shaped carriage member to move relative to the support plate.

Connected to the bottom portion of the U-shaped carriage member is a conveyer member positioned in perpendicular relationship to the vertical column of the inverted L-shaped frame. Thus, as the U-shaped carriage member is driven, the conveyer member moves vertically relative to the horizontal arm.

The conveyer member comprises an elongate member having an endless flexible belt wound longitudinally about its upper and lower surfaces. The endless flexible belt is driven longitudinally about the elongate member by a motor, which can rotate bi-directionally. To prevent the flexible belt from flapping during rotation, a pair of shrouds is placed along the opposed sides of the elongate member.

To move a workpiece along a worktable, the inverted L-shaped frame is positioned relatively to the worktable such that at least a portion of the conveyer member is superposed over a portion of the to be moved workpiece. Upon activation, the cylinder effects the U-shaped carriage member to move downward to drive the elongate member, more specifically the belt wound therearound, into contact with the surface of the workpiece. Thereafter, the motor is activated to drive the belt to thereby convey the workpiece along the worktable, and eventually remove it therefrom.

To enable the conveyer member to be positioned closer to the moving portion of the machine tool, and therefore having a greater portion of the conveyer member superposed over the to be moved workpiece, a variant of the present invention part moving system has the inverted U-shaped carriage member movably mounted to the support base plate at an angle so that the conveyer member is movable upwardly and downwardly at an angle relative to the vertical column of the L-shaped frame.

Inasmuch as the present invention part moving system is substantially portable, it can be moved with relative ease, as compared to the currently known loading/unloading systems, so that it may be used with different metal fabricating machines including but not limited to, for example, turret punches and nibbling tools. Indeed, the present invention part moving system may also be used with other parts fabricating machines including those that operate on non-metallic materials since it is adaptable to move both metallic and non-metallic pieces. Moreover, the present invention part moving system is more economical than the known loading/unloading systems and therefore is readily affordable.

It is therefore an objective of the present invention to provide a part moving system that is economical.

It is another objective of the present invention to provide a portable part moving system that is adaptable to work with a wide range of material fabricating machineries.

It is yet another objective of the present invention to provide a part moving system that is simple to use and does not require precise adjustment.

BRIEF DESCRIPTION OF FIGURES

The above-mentioned objectives and advantages of the present invention will become apparent and the invention itself will best be understood by reference to the following description of embodiments of the invention taken in conjunction with the accompanying drawings, wherein.

DETAILED DESCRIPTION OF THE INVENTION

Figure 3:
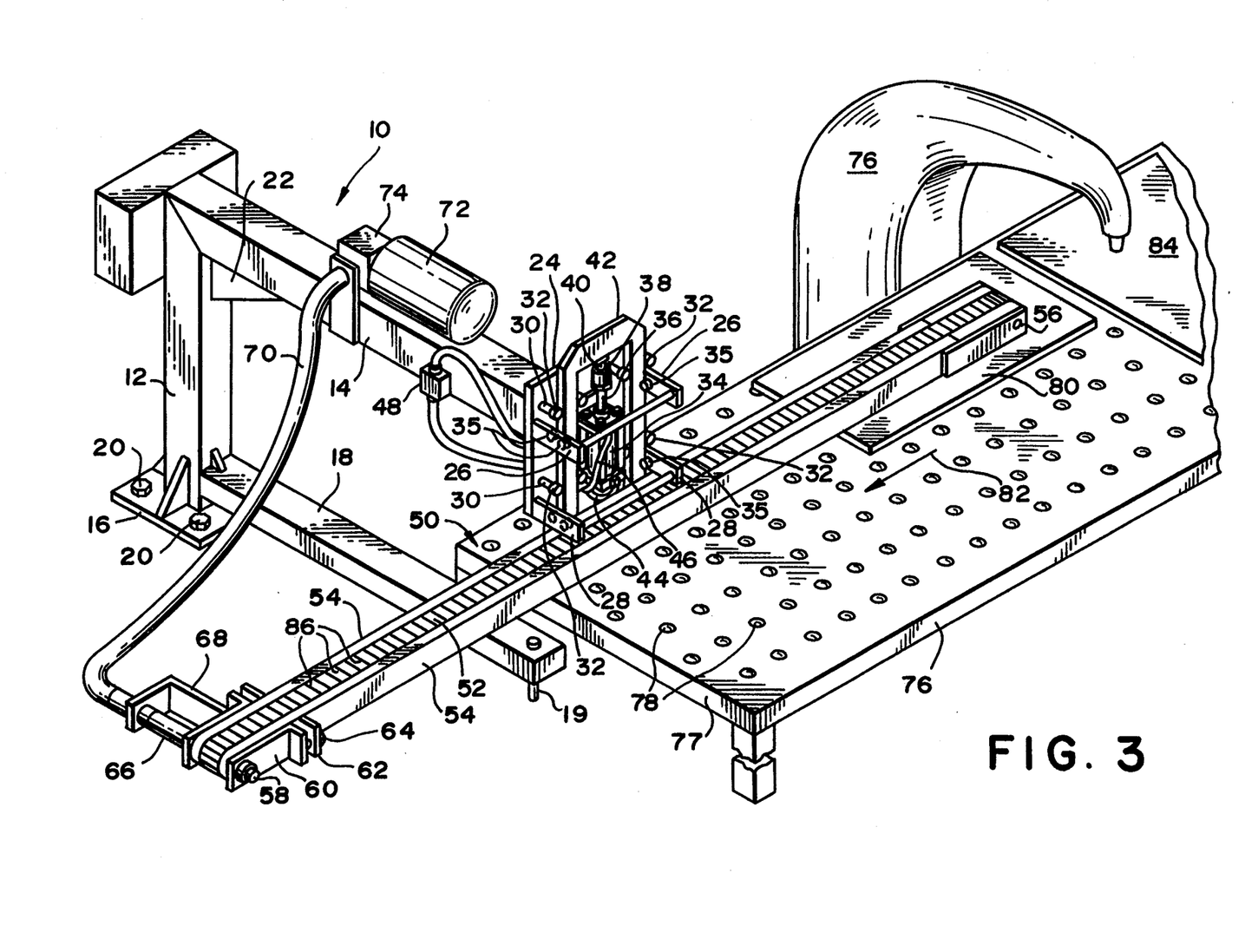
FIG. 3 is a perspective view of the present invention system being illustrated in an exemplar working environment.
Figure 4:
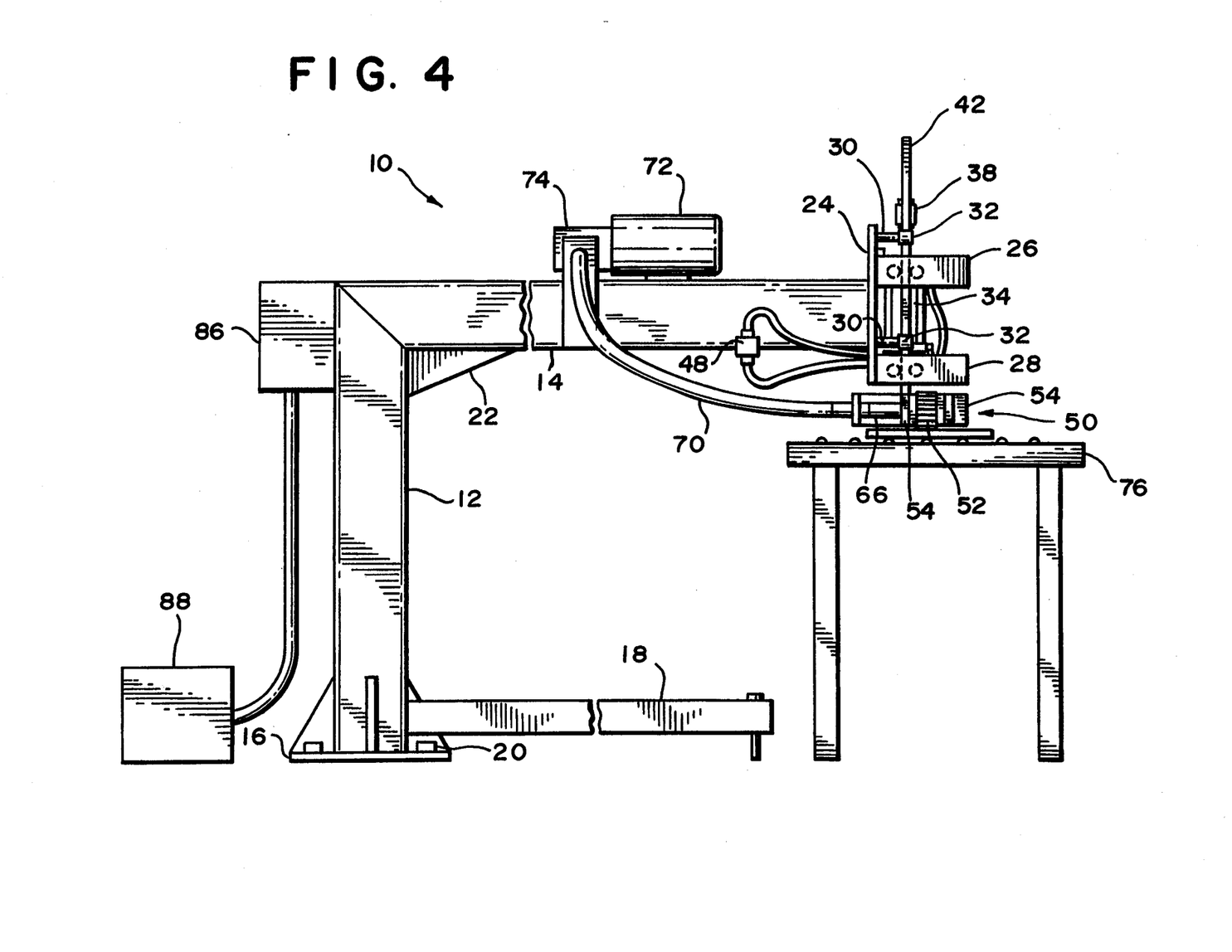
FIG. 4 is a side view of the present invention system.
Figure 5:
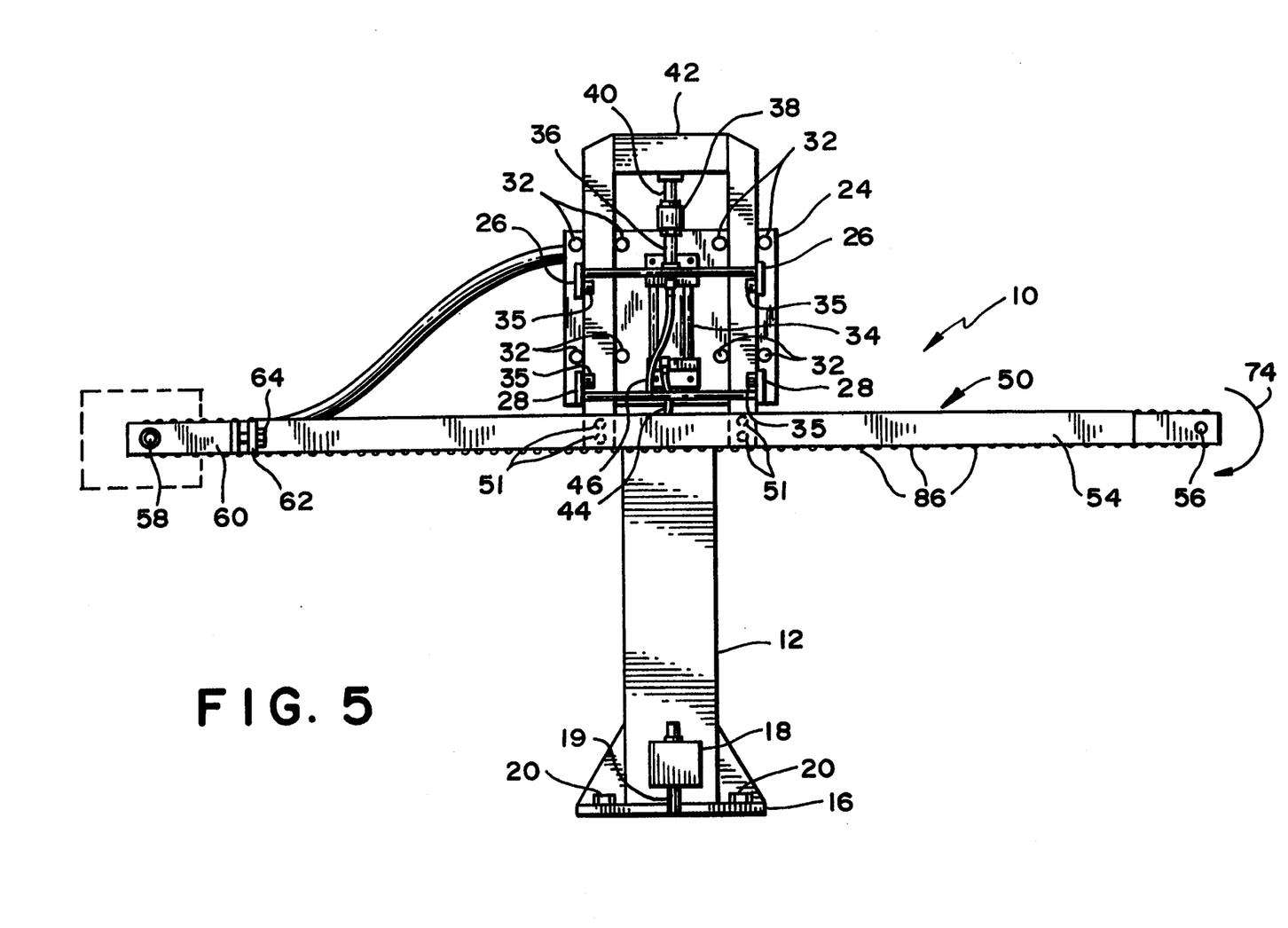
FIG. 5 is a front view of the present invention system.

With reference to FIGS. 3, 4 and 5, the present invention part moving system 10 is shown to include an inverted L-shaped frame comprising a vertical support column 12 and a horizontal extension arm 14. Vertical column 12 is supported by a base 16. To provide balance for the L-shaped frame, a leg 18 extends from the bottom portion of vertical support column 12. The inverted L-shaped frame may be permanently bolted to one location, as for example by means of bolts 20 at support base 16. Alternatively, base 16 may be fitted with lockable casters so that system 10 may be moved to a different location, when the need arises. In any event, inasmuch as bolts 20 are easily removed, system 10 is portable. An adjustment bolt 19 is threaded at the end portion of leg 18 to provide a leveling effect for the L-shaped frame. A triangular portion 22 provides added support to horizontal extension arm 14.

As best shown in FIG. 4, at the end of extension arm 14 there is coupled a support plate 24. Extending from support plate 24 are two upper arms 26 and two lower arms 28. Further integrated to support plate 24 are extension fingers 30, each of which has mated to its extremity portion a roller 32.

Also bolted to support plate 24 is a drive cylinder 34 (for example an air cylinder) whose shaft 36 is connected to an adjustment mechanism 38, which in turn is threadedly mated to a threaded bolt 40 that is connected to the upper cross member of an inverted U-shaped carriage frame 42. To control the extension and retraction of shaft 36 of air cylinder 34, air is supplied thereto and retrieved therefrom via a pair of hoses 44 and 46, which are connected to an air valve 48 bolted to the side of extension arm 14. Air valve 48 is a Mecman drive bidirectional pneumatic valve whose part number is 585-211001, and whose function is to selectively provide air to air cylinder 34 to thereby effect bidirectional movement of shaft 34. For the sake of simplicity, the air supply hose providing air to valve 48 is not shown. Air cylinder 34 is a Mecman cylinder having part number 167-08.

Figures 6, 7:
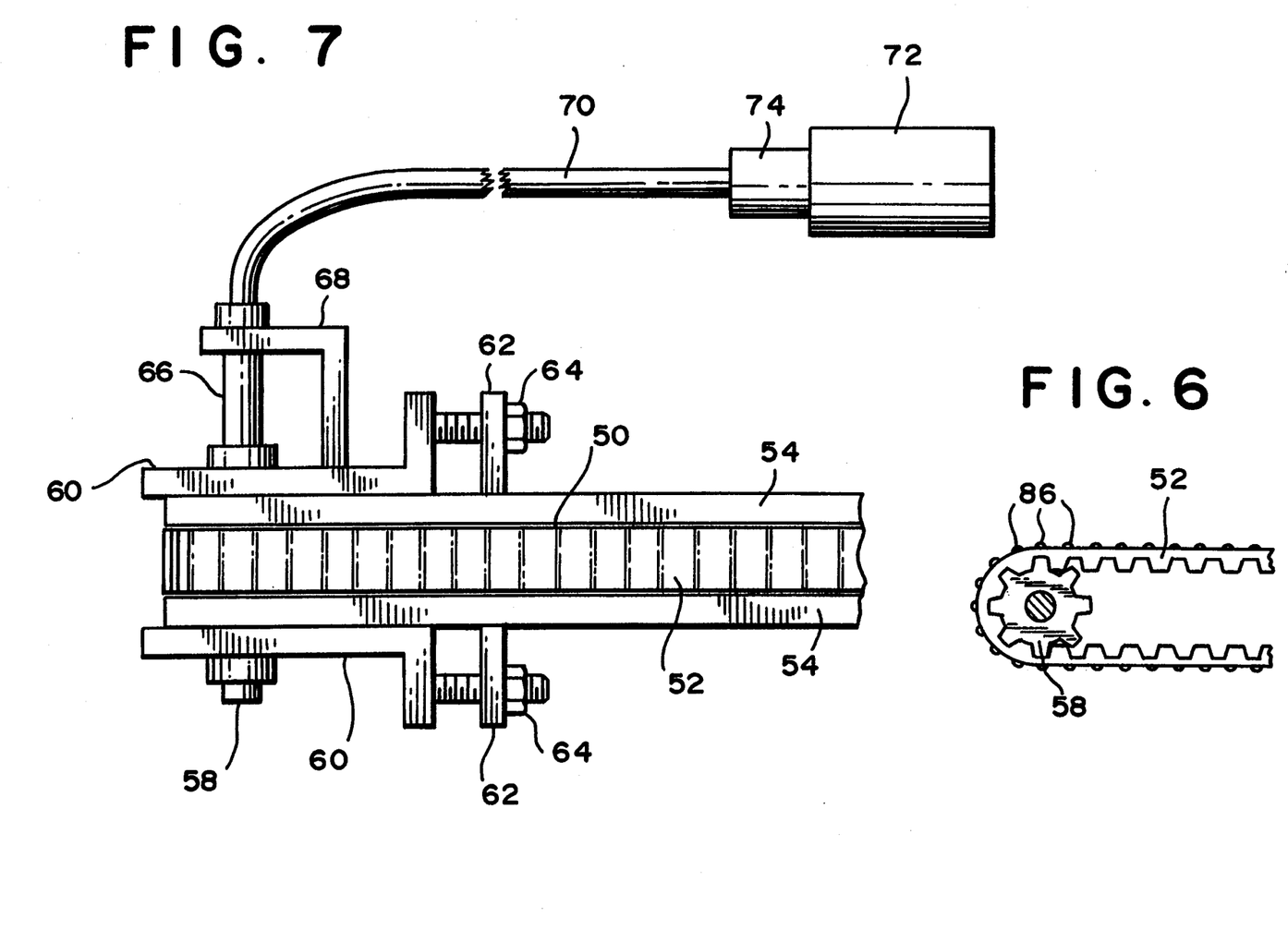
FIG. 6 is an enlarged view of the dotted portion of the FIG. 5 illustration.
FIG. 7 is an enlarged plan view of the driving end of the conveyer of the present invention.

As shown in the figures, U-shaped carriage member 42 is connected to shaft 36 of air cylinder 34 by means of a threaded bolt 40 and an adjustment mechanism 38. As best shown in FIGS. 4 and 5, an elongate conveyer member 50, positioned in perpendicular relationship to vertical column 12, is coupled to the lower portion of the two legs extending from U-shaped carriage member 42 by, for example, bolts 51. Wound about the longitudinal upper and lower surfaces of elongate conveyer member 50 is an endless belt 52, which is prevented from flapping as it slides along elongate conveyer member 50 by a pair of shrouds 54. Flexible belt 52 is rotatably guided by an end roller gear 56 and a driven gear 58. As shown more clearly in FIG. 6, the inner circumferential surface of belt 52 has regularly spaced rectangular extensions that mate with the teeth of gear 58 so that, as gear 58 rotates, belt 52 is driven. Do note, however, that belt 52 does not have to have spaced extensions at its inner circumferential surface and driven gear 58 does not have to have teeth. Instead, belt 52 could be driven just as easily by drive gear 58 if the former is a plain endless belt and the latter a drive roller.

To provide the necessary tension, or to replace belt 52, corresponding end pieces 60 are adjustably connected by respective bolts 64 (only one is shown) to corresponding end flanges 62 of shrouds 54. The tension of belt 54 may be increased by adjusting bolts 64 to move end pieces 60 away from flange 62. To replace belt 52, end pieces 60 are adjusted toward flange 62.

Gear 58 is driven by a drive rod 66 which is held to inner end piece 60 by a bracket 68. Rod 66 in turn is driven by a motor 72 via a flexible drive shaft 70. The necessary gear ratio is provided in a gear box 74 connected to motor 72. For the instant invention, albeit belt 52 is ordinarily driven along the direction indicated by directional arrow 74 (FIG. 5), motor 72 may nonetheless be a bidirectional motor so that belt 52 may be driven to rotate bidirectionally.

As best shown in FIGS. 3 and 5, the two legs of U-shaped carriage member 42 are guidedly positioned between rollers 32 such that carriage member 42 may be driven vertically relative to support plate 24 by air cylinder 34. A second set of rollers 35 are provided at upper and lower arms 26, 28 of support plate 24 to provide guidance to the front and back surfaces of carriage member 42. Thus, when driven by shaft 36 of air cylinder 34, carriage member is smoothly moved. Adjustment mechanism 38, as its name implies, enables an operator to adjust the stroke of shaft 36 to thereby conform the vertical movement of conveyer member 50 to different worktables, and more importantly, contact pressure of conveyer member 50 on workpieces of different thickness on the worktables.

With reference to FIG. 3, the present invention system is shown to operate in an environment in which it has been positioned in relative relationship to a machine tool, for example a nibbling tool 76. As shown, system 10 is positioned such that conveyer member 50 is positioned above worktable 76, which, for the instant embodiment, is a table having a tabletop embedded with a plurality of roller bearings 78. Accordingly, a metallic or non-metallic workpiece such as, for example, 80 can be slidably moved along the top surface of table 76. It should be appreciated that albeit a single worktable 76 is shown, in actuality, nibbling tool 76 has its own work area to which table 76 is adjacently positioned. It should further be appreciated that albeit a table having a plurality of roller bearings is shown, a table having a number of rollers, or for that matter a table whose tabletop has a low coefficient of friction, may also be used. It should moreover be appreciated that workpiece 80 may be either metallic or non-metallic, and that the present invention is adaptable to cooperate with a machine tool that is operable on non-metallic materials. Thus, both ferrous and non-ferrous parts are movable by the present invention.

In operation, with reference to FIG. 3, to move workpiece 80 away from nibbling tool 76, after the L-shaped frame 10 has been positioned relative to table 76 such that at least a portion of conveyer member 50 is superposed over a portion of workpiece 80, bidirectional valve 48 is activated to provide/remove air to/from air cylinder 34 to movably drive shaft 36 to thereby place conveyer member 50 in contact with the top surface of workpiece 80. By applying the appropriate pressure against workpiece 80 and at the same time activating motor 70 to rotate belt 52 in the direction indicated by arrow 74 (FIG. 5), workpiece 80 is conveyed in the direction of arrow 82 (FIG. 3). If the appropriate storage bin or rack, such as for example a pallet (not shown), is positioned adjacent edge 77 of worktable 76, given the positioning of conveyer 50, workpiece 80, which for this discussion may be considered to be a finished workpiece that has been separated from main workpiece 84, is moved away from the work area of tool 76 and be further removed from table 76 onto the pallet. Once a sufficient number of finished workpieces have been stacked thereonto, the loaded pallet is transported away from worktable 76.

To provide better conveyance characteristics, belt 52, in addition to having a rectangular configuration on its inner circumferential surface, may also have a number of regularly spaced extensions 86 integrated to its outer surface. For conveyer 50, in addition to having gears 56 and 58 located at its respective end positions, a number of rollers matching the rectangular configuration at the inner surface of belt 52 may be used to provide a smoother driving of belt 52. Alternatively, belt 52 may slidably rest on upper and lower low coefficient of friction surfaces.

To control the operation of valve 48, air cylinder 34 and motor 72, a control box 86 is coupled to the rear top portion of vertical column 12 of the L-shaped frame. Such control panel and the electrical relays and circuities needed to control the operation of a motor is well known and therefore will not be further discussed. Power may be provided to the system, via control panel 86, from a power supply 88. As was mentioned previously, the hose connecting valve 48 to the necessary air supply is not shown for the sake of simplicity.

Figure 8:
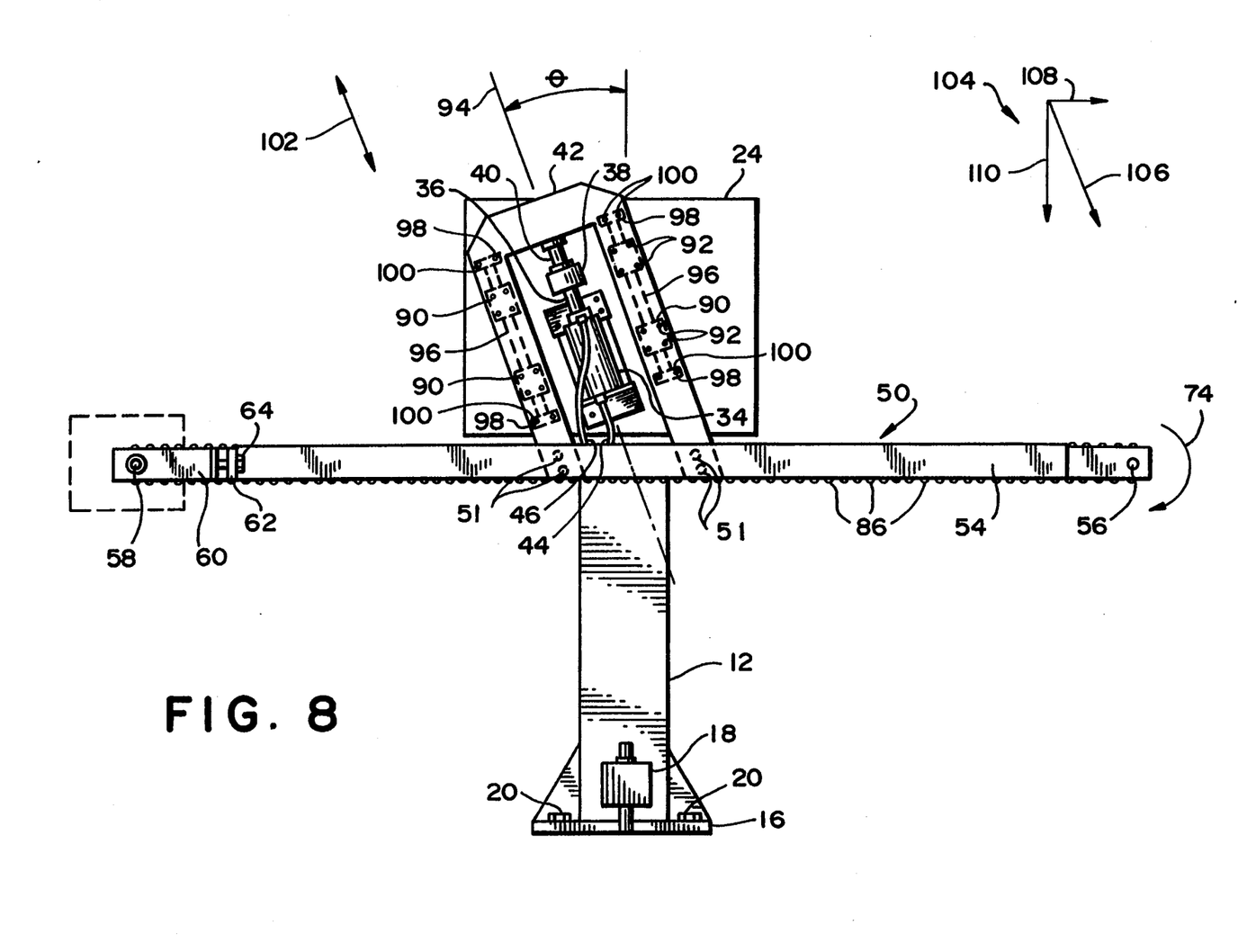
FIG. 8 is a frontal view of a variant of the present invention system in which the elongate conveyer member is afforded a movement with a greater degree of freedom.

A variant of the present invention part moving system is shown in FIG. 8. There, it can be seen that U-shaped carriage frame 42 is movably mounted to support plate 24 at an off-set angle $\theta$, by means of conventional linear motion (LM) or Thompson bar type guides. As shown, each of the legs of U-shaped carriage frame 42 is mounted to a Thompson guide, via two bearings 90 by means of 4 bolts 92 on each of the bearings. Bearings 90 are movably mounted to rod 96 and thus are movable longitudinally along axis 94. Each of the Thompson guides is mounted to support plate 24 via its two end mounts 98 by means of bolts 100. Thus, since the Thompson guides are mounted to support plate 24 per the end mounts and the legs of the U-shaped carriage frame 42 are mounted to bearings 90 of the respective Thompson guides, when carriage 42 is driven by shaft 36 of air cylinder 34, U-shaped carriage frame would move longitudinally along axis 94, as indicated by directional arrows 102. For the FIG. 8 variant, inasmuch as the U-shaped carriage frame is clearly mounted to bearings 90 which in turn are slidably fixed to shafts 96 of the Thompson guides, there is no need to have any support members extending from support plate 24 such as upper arms 26 and lower arms 28 for the embodiment shown in FIG. 3. As before, each leg of the off-set mounted U-shaped carriage frame 42 is fixedly bolted to elongate carriage member 50 by means of bolts 51.

In operation, inasmuch as it is movable vertically relative to vertical support column 12 at off-set angle $\theta$, the end of elongate conveyer member 50 theoretically can be placed closer to the area to which a workpiece is being worked on even though the L-shaped frame of the part moving mechanism may be positioned at the same location as was the earlier discussed embodiment. To illustrate, consider the force parallelogram 104. As shown, the downward movement of U-shaped carriage frame 42 is represented by arrow 106 whose X and Y components are designated 108 and 110, respectively. Thus, as can easily be seen, for the embodiment shown in FIG. 3, when driven, elongate conveyer member 50 would only move in a direction as indicated by component arrow 110. For the FIG. 8 embodiment, however, when driven, elongate conveyer member 50 would move both vertically and horizontally in the direction indicated by arrow 106. Consequently, the horizontal direction in which conveyer member 50 is positioned, as it moves downwards, is indicated by X component arrow 108. Thus, not only could elongate conveyer member 50 reach deeper into the throat of the machine tool to better grip the to be moved workpiece, it could also move further away from the working area of the machine tool to thereby provide less interference thereto.

While a preferred embodiment of the present invention is disclosed herein for purposes of explanation, numerous changes, modifications, variations, substitutions and equivalents, in whole or in part, should now be apparent to those skilled in the art to which the instant invention pertains. Accordingly, it is intended that this invention be limited only be the spirit and scope of the hereto appended claims.

I claim:

1. In cooperation with a work station having a tool to effect work on workpieces, apparatus separate from and positioned relative to said work station for moving a to be moved workpiece on a worktable, comprising:

an elongate conveyer means positioned over at least one part of said worktable:

means for moving said conveyer means into contact with said to be moved workpiece on said worktable to conveyedly move said workpiece on said worktable;

a frame;

a support coupled to said frame and including a carriage member movable relative to said frame for securing said elongate conveyer means;

wherein said moving means is mounted to said support and comprises a drive cylinder whose shaft is coupled to said carriage member for moving said carriage member to position said elongate conveyer means vertically relative to said frame into contact with said workpiece;

wherein said carriage member is movably mounted to said support at an angle vertically offset from said frame.

2. Apparatus for moving a workpiece on a worktable, comprising:

a frame separate from said worktable;

an elongate conveyer means movably attached to said frame, said frame being located relative to said worktable so that at least one portion of said elongate conveyer means is positioned over said workpiece;

motive means for moving said elongate conveyer means relative to said frame to contact said workpiece so that said conveyer means can move said workpiece relative to said worktable;

wherein said elongate conveyer means comprises:

an elongate member;

an endless belt movably wound longitudinally about the upper and lower surfaces of said elongate member;

means for driving said endless belt about said elongate member to slidably move said workpiece along said worktable once said elongate member has been moved by said motive means into contact with said workpiece;

a support attached to said frame;

a carriage member movably coupled to said support and having secured thereto said elongate member, said carriage member being driven by said motive means to move relative to said support to thereby move said elongate member;

wherein said carriage member is movably mounted to said support via bearings slidably mounted about at least one shaft coupled to said support, said carriage member slidable longitudinally along the length of said shaft:

wherein said carriage member is movably mounted to said support at an angle vertically offset from said frame.

* * * * *